(12) United States Patent
Charles

(10) Patent No.: US 12,433,788 B2
(45) Date of Patent: Oct. 7, 2025

(54) OPHTHALMIC SURGICAL TOOL

(71) Applicant: Alcon Inc., Fribourg (CH)

(72) Inventor: Steven T. Charles, Memphis, TN (US)

(73) Assignee: Alcon Inc., Fribourg (CH)

( * ) Notice: Subject to any disclaimer, the term of this patent is extended or adjusted under 35 U.S.C. 154(b) by 629 days.

(21) Appl. No.: 17/660,223

(22) Filed: Apr. 22, 2022

(65) Prior Publication Data

US 2022/0362057 A1 Nov. 17, 2022

Related U.S. Application Data

(60) Provisional application No. 63/189,293, filed on May 17, 2021.

(51) Int. Cl.
*A61F 9/007* (2006.01)
*A61L 31/08* (2006.01)

(52) U.S. Cl.
CPC ........ *A61F 9/00763* (2013.01); *A61L 31/088* (2013.01)

(58) Field of Classification Search
CPC ............... A61F 9/00763; A61L 31/088; A61B 2017/00853; A61B 2017/305; A61B 17/3201; A61B 10/02; A61B 2010/045; A61B 17/3207; A61B 17/320016
See application file for complete search history.

(56) References Cited

U.S. PATENT DOCUMENTS

| | | |
|---|---|---|
| 4,473,076 A | 9/1984 | Williams et al. |
| 4,877,026 A | 10/1989 | De |
| 5,263,958 A | 11/1993 | Deguillebon |
| 5,275,607 A | 1/1994 | Lo |
| 5,562,693 A | 10/1996 | Devlin |
| 6,221,069 B1* | 4/2001 | Daikuzono ............ A61B 18/28 606/16 |

(Continued)

FOREIGN PATENT DOCUMENTS

| | | |
|---|---|---|
| EP | 0003668 A2 | 8/1979 |
| WO | 9409711 A1 | 5/1994 |

(Continued)

OTHER PUBLICATIONS

Alcon Surgical Retina Product Catalog, V4, (dated 2019) (accessed online Feb. 17, 2021) pp. 21-27.

*Primary Examiner* — Ashley L Fishback
*Assistant Examiner* — Chima U Igboko

(57) ABSTRACT

Embodiments of the present disclosure generally relate to microsurgical cutting devices for ophthalmic procedures. In certain embodiments, a cutting tool assembly includes a first blade in a fixed position and a second blade configured to move relative to the first blade to perform a cutting motion. The first blade includes a first longitudinal body portion and a first end portion extending laterally from the first body portion. A distal surface of the first end portion has a bowed morphology to match a curvature of a retinal surface and is further coated with a first coating to reduce damage to ocular tissues during use. The second blade includes a second longitudinal body portion and a second end portion extending laterally from the second body portion. A distal surface of the second end portion includes a cutting edge for cutting tissues, while a proximal surface thereof is coated with a second coating.

11 Claims, 5 Drawing Sheets

(56) References Cited

U.S. PATENT DOCUMENTS

| | | |
|---|---|---|
| 6,908,476 B2 | 6/2005 | Jud |
| 8,475,479 B2 | 7/2013 | Linsi |
| 8,668,708 B2 | 3/2014 | Linsi |
| 9,028,514 B2 | 5/2015 | Insi |
| 10,675,180 B2 | 6/2020 | Grueebler |
| 10,682,202 B2 | 6/2020 | Abt |
| 10,881,286 B2 | 1/2021 | Tesar et al. |
| 11,166,844 B2 | 11/2021 | Charles |
| 2006/0095056 A1* | 5/2006 | Douglas ............. A61B 17/3211 606/159 |
| 2008/0188877 A1 | 8/2008 | Hickingbotham |
| 2009/0124852 A1* | 5/2009 | Suzuki ............... A61B 18/1445 606/205 |
| 2011/0196399 A1 | 8/2011 | Robertson et al. |
| 2016/0296246 A1 | 10/2016 | Schaller |
| 2020/0375797 A1 | 12/2020 | Maschio |
| 2021/0113376 A1 | 4/2021 | Grueebler et al. |
| 2021/0113377 A1 | 4/2021 | Filipin |

FOREIGN PATENT DOCUMENTS

| | | |
|---|---|---|
| WO | 0230302 A1 | 4/2002 |
| WO | 0230303 A1 | 4/2002 |
| WO | 2012099641 A1 | 7/2012 |

* cited by examiner

OPHTHALMIC SURGICAL TOOL

PRIORITY CLAIM

This application claims the benefit of priority of U.S. Provisional Patent Application Ser. No. 63/189,293 titled "OPHTHALMIC SURGICAL TOOL," filed on May 17, 2021, whose inventor is Steven T. Charles, which is hereby incorporated by reference in its entirety as though fully and completely set forth herein.

FIELD

The present disclosure relates to microsurgical tools, and more specifically, to ophthalmic cutting devices and methods of use thereof.

BACKGROUND

Many microsurgical procedures require precision cutting and/or removal of various body tissues. For example, vitreoretinal procedures such as retinotomies, retinectomies, autologous retinal transplants, and vitrectomies typically require the cutting, removal, dissection, delamination, coagulation, or other manipulation of intraocular tissues such as the retina, vitreous humor, traction bands, and membranes.

The retina, or the innermost layer lining the back wall of the eye, is responsible for receiving, modulating, and transmitting visual stimuli from the external environment to the optic nerve, and ultimately, the visual cortex of the brain. Structurally, the retina is a complex and delicate tissue with numerous types of cells arranged in multiple cellular layers. Due to the retina's role in vision and its fragility, damage thereto may result in severe loss of vision or even permanent blindness. Therefore, cutting, removal, or other manipulation of the retina must be done with great care to avoid unwanted retinal trauma.

Ophthalmic microsurgical instruments, such as vitrectomy probes, fiber optic illuminators, infusion cannulas, aspiration probes, scissors, forceps, and lasers are typically utilized during vitreoretinal surgery. These devices are generally inserted through one or more surgical incisions in the sclera near the pars plana, which are called sclerotomies. One exemplary ophthalmic surgical device includes a cutting tool having a cutting blade disposed within a tubular probe needle. The cutting blade moves reciprocally within the probe needle relative to a second blade that is fixed within the tubular needle. The moving blade cuts material, e.g., retinal or membrane tissue, in a guillotine-like motion adjacent the fixed blade.

In order to reduce potential damage to the surgical site and reduce patient recovery time, ophthalmic surgical tools, such as the cutting tool described above, are being designed in progressively smaller sizes to facilitate correspondingly smaller surgical incisions. However, despite the smaller size, avoiding unwanted trauma during vitreoretinal procedures can still be very challenging with currently available cutting tools due to the shape and/or indelicate material compositions thereof. Therefore, there is a need in the art for ophthalmic cutting devices and methods of use thereof that address the drawbacks described above.

SUMMARY

The present disclosure relates to ophthalmic surgical tools, and more specifically, to ophthalmic microsurgical cutting devices and methods of use thereof.

In certain embodiments, a cutting tool assembly is provided. The cutting tool assembly includes a first blade in a fixed position and a second blade configured to move relative to the first blade. The first blade includes a first longitudinal body portion and a first end portion extending laterally from a distal end of the first longitudinal body portion. A distal surface of the first end portion is coated with a first polymer coating. The second blade includes a second longitudinal body portion and a second end portion extending laterally from a distal end of the second longitudinal body portion. A distal surface of the second end portion includes a cutting edge, while a proximal surface thereof is coated with a second polymer coating. Longitudinal movement of the second blade facilitates cutting of a tissue by the cutting edge.

In certain embodiments, a surgical tool assembly is provided. The surgical tool includes a tubular shaft and a cutting tool assembly. The tubular shaft defines a longitudinal axis and an aperture at a first end of the tubular shaft. The cutting tool assembly is received at least partially within the tubular shaft through the aperture and extends along the longitudinal axis. The cutting tool assembly includes a first blade in a fixed position and a second blade configured to move relative to the first blade. The first blade includes a first longitudinal body portion and a first end portion extending laterally from a distal end of the first longitudinal body portion. A distal surface of the first end portion is coated with a first polymer coating. The second blade includes a second longitudinal body portion and a second end portion extending laterally from a distal end of the second longitudinal body portion. A distal surface of the second end portion includes a cutting edge, while a proximal surface thereof is coated with a second polymer coating. Longitudinal movement of the second blade facilitates cutting of a tissue by the cutting edge.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, and may admit to other equally effective embodiments.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
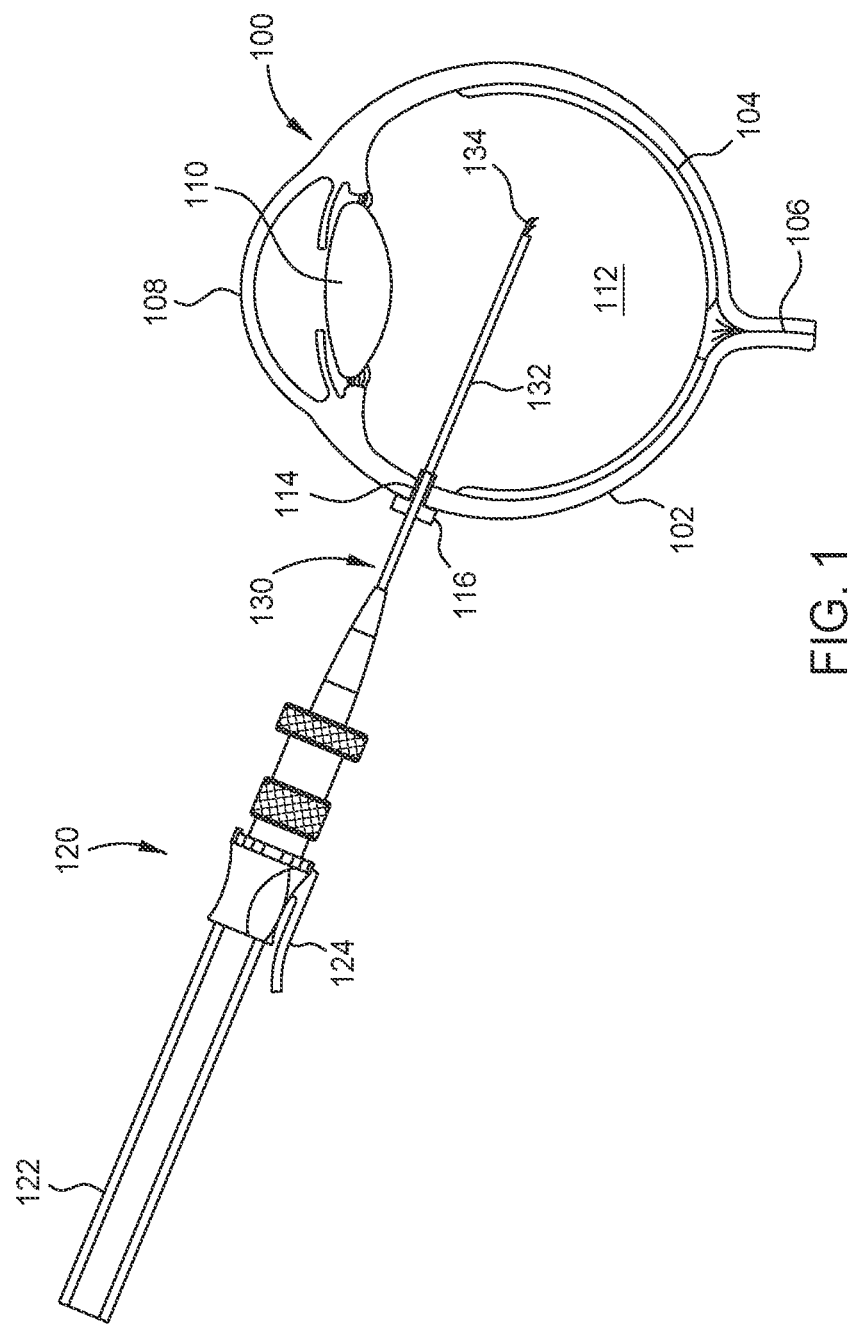
FIG. 1 illustrates an exemplary surgical device and cutting tool assembly that are used in combination during an ophthalmic surgical procedure, in accordance with certain embodiments of the present disclosure.

In the following description, details are set forth by way of example to facilitate an understanding of the disclosed subject matter. It should be apparent to a person of ordinary skill in the field, however, that the disclosed implementations are exemplary and not exhaustive of all possible implementations. Thus, it should be understood that reference to the described examples is not intended to limit the scope of the disclosure. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

Note that, as described herein, a distal end, segment, or portion of a component refers to the end, segment, or portion that is closer to a patient's target tissue during use thereof. On the other hand, a proximal end, segment, or portion of the component refers to the end, segment, or portion that is distanced further away from the patient's target tissue.

As used herein, the term "about" may refer to a +/−10% variation from the nominal value. It is to be understood that such a variation can be included in any value provided herein.

Embodiments of the present disclosure generally relate to microsurgical cutting devices for ophthalmic procedures. As described above, currently, microsurgical cutting devices are used in a wide range of vitreoretinal procedures, including retinotomies, retinectomies, proliferative vitreoretinopathies (PVR), autologous retinal transplants, and similar procedures. However, certain existing cutting tool designs, though effective for cutting, may facilitate unwanted damage to tissues (e.g., the retina and retinal pigment epithelium (RPE)) adjacent to target cut sites due to the unrefined outer surface profiles of their cutting blades and/or the indelicate materials they are formed of.

The cutting devices described herein address the deficiencies of certain existing designs and reduce the risk of unwanted damage to peripheral tissues by providing cutting blades with curved outer surface profiles, which may further be coated, such as with a polymer coating, to further enhance the safety thereof. Accordingly, the cutting devices described herein may be utilized to more safely perform, for example: linear retinotomies to insert induced pluripotent stem cell (iPSC) derived retinal pigment epithelium (RPE) monolayers on a biodegradable scaffold for treatment of geographic atrophy from dry age-related macular degeneration (AMD); linear retinotomies to insert photoreceptor progenitor (PhRP) monolayers on biodegradable scaffolds for treatment of a variety of retinal disorders including dry AMD, long standing retinal detachment, and inherited retinal disorders such as retinitis pigmentosa (RP); circumferential retinotomies to treat PVR-related retinal detachments, e.g., by removing tissue anterior to a circumferential cut to reduce PVR recurrence rate and epiciliary tissue which can cause hypotony; autologous macular patch graft transplants to treat large macular holes, which are all very challenging with current cutting tool designs; as well as other similar procedures.

In certain embodiments described herein, a cutting tool assembly includes a first blade in a fixed position and a second blade configured to move relative to the first blade. The first blade includes a first longitudinal body portion and a first end portion extending laterally from a distal end of the first longitudinal body portion. A distal surface of the first end portion has a bowed morphology to match a curvature of a retinal surface and is further coated with a first polymer coating to reduce damage to retinal tissues (e.g., retinal pigment epithelium (RPE) or photoreceptor layer) during use thereof. The second blade includes a second longitudinal body portion and a second end portion extending laterally from a distal end of the second longitudinal body portion. A distal surface of the second end portion includes a cutting edge, while a proximal surface thereof is coated with a second polymer coating. Longitudinal movement of the second blade facilitates linear or circumferential cutting of a tissue, such as retinal or membrane tissue, for performance of ophthalmic surgical procedures such as those described above.

FIG. 1 illustrates a cross-sectional view of an eye 100 with a surgical device 120 at least partially inserted therein for performance of an ophthalmic surgical procedure, according to certain aspects of the present disclosure. The surgical device 120 is used in combination with a cutting tool assembly 130 for performing various vitreoretinal procedures within the eye 100, including retinotomies, retinectomies, and other procedures requiring the cutting of one or more tissues of the eye 100.

A number of features of the eye 100 are illustrated herein for reference. Generally, the eye 100 includes the sclera 102 that is attached to the retinal membrane or retina 104 by the choroid. The choroid includes connective tissue that attaches the retina 104 to the inside wall of the sclera 102 at the back of the eye and provides oxygen and nourishment to the outer layers of the retina 104. The retina 104 is a delicate and complex multi-layered tissue containing photo-activated cells that transmit signals, based on visual stimuli, through the optic nerve 106 to the brain. The cornea 108 permits light to enter the eye 100, the light being focused by a lens 110.

The surgical device 120 generally includes a handpiece 122, which is connected to the cutting tool assembly 130 at a distal end of the handpiece 122 for use therewith. The cutting tool assembly 130 consists of a tubular body 132 and a pair of blades 134 at least partially disposed in the tubular body 132 and extending from a distal end thereof. As illustrated, the cutting tool assembly 130 is introduced into an intraocular space 112 by a user through an opening 114 in the sclera 102, which may be formed by a trocar blade that is positioned inside cannula 116. The cannula 116 is configured to allow a user to insert various surgical devices into the eye 100 without causing damage to the surrounding tissue (e.g., sclera 102). The cannula 116 may range in size from 20-gauge to 27-gauge, and the cutting tool assembly 130 may have corresponding dimensions to fit therethrough. In certain embodiments, the cutting tool assembly 130 is sized to fit through a 23-gauge, 25-gauge, or 27-gauge cannula 116.

After the cutting tool assembly 130 is inserted into the eye 100 via the cannula 100, the user can move the handpiece 122 to vary the position and depth of the cutting tool assembly 130, and in particular, the blades 134, within the eye 100. Once the blades 134 are positioned proximate to a target tissue to be cut (in this example, the blades 134 are positioned adjacent to the retina 104), the user may operate an actuation mechanism 124 of the surgical device 120 to cause a cutting motion by the blades 134, described in further detail with reference to FIGS. 5A-5B. In certain embodiments, the actuation mechanism 124 is manual actuator that can be directly manipulated by the user. In certain other embodiments, the actuation mechanism 124 is a pneumatic or electric actuator.

Figure 2:
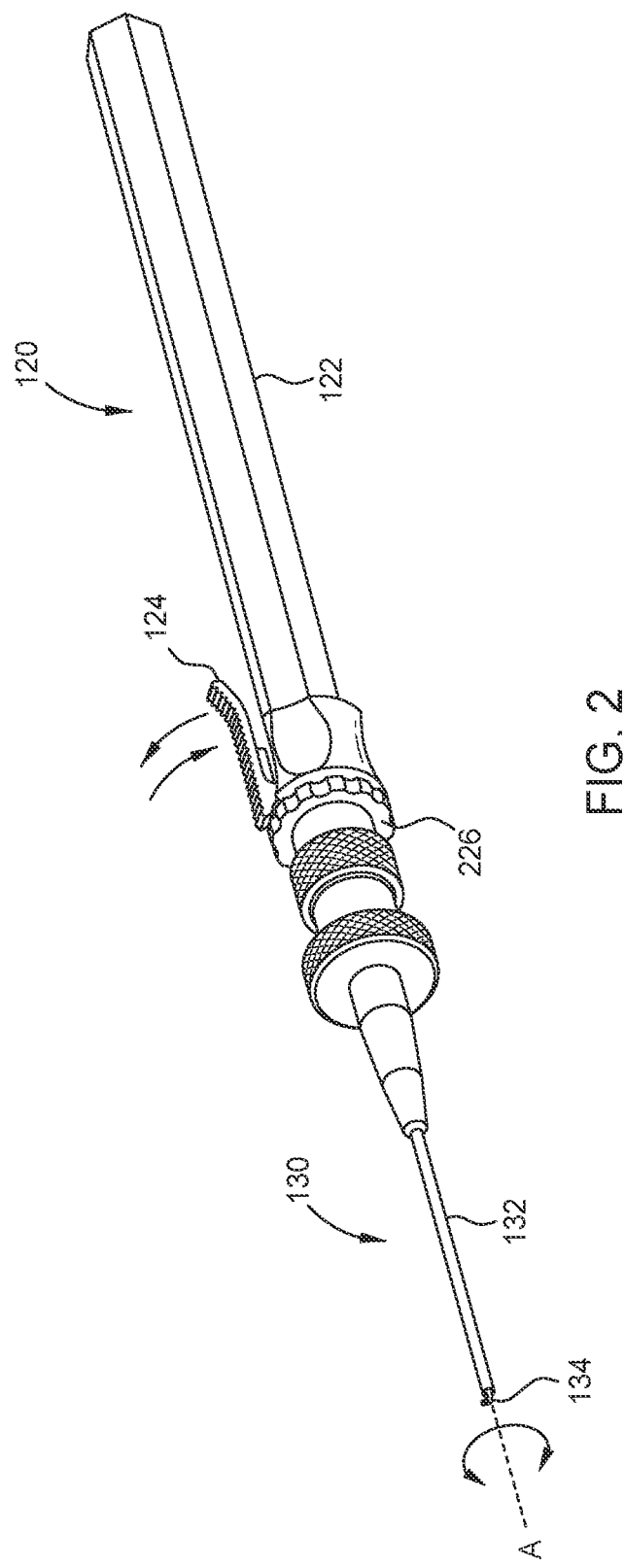
FIG. 2 illustrates a perspective view of the surgical device and the cutting tool assembly of FIG. 1, in accordance with certain embodiments of the present disclosure.

FIG. 2 illustrates the surgical device 120 in more detail. As described above, the surgical device 120 includes the handpiece 122 configured to be grasped, e.g., by a surgeon, and the actuation mechanism 124 operable to actuate the cutting tool assembly 130. In the embodiments of FIGS. 1 and 2, the actuation mechanism 124 is radially pivotable relative to the handpiece 122. The lever can be actuated by a finger or other portion of a user's hand while grasping the handpiece 122, thus decoupling the actions of positioning and actuating the cutting tool assembly 130 for increased positioning precision. In certain embodiments, the surgical device 120 further includes a rotatable component 226 operable to adjust the rotational orientation of the cutting tool assembly 130 for improved versatility during a surgical procedure. For example, the rotatable component 226 may include a disc that is rotatable about a longitudinal axis A of the tubular member 132 of the cutting tool assembly 130 (represented by arrows in FIG. 2).

Figure 3:
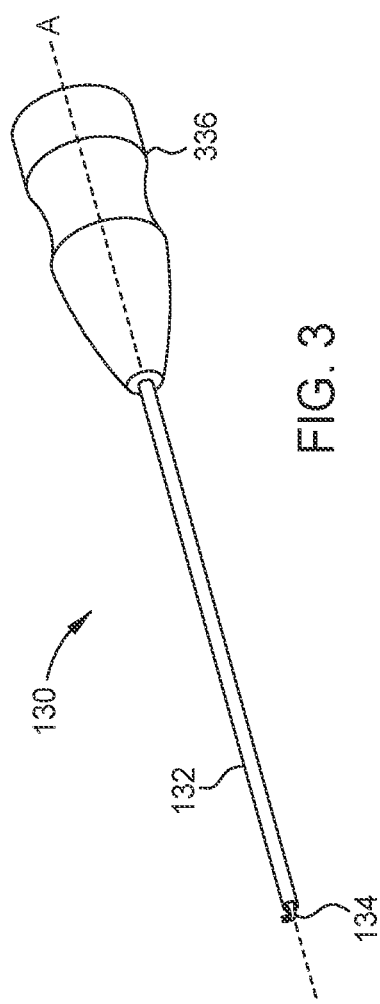
FIG. 3 illustrates a perspective view of the cutting tool assembly of FIGS. 1 and 2 with an adapter, in accordance with certain embodiments of the present disclosure.

The cutting tool assembly 130 couples to the handpiece 122 at a proximal end of the cutting tool assembly 130 and the distal end of the handpiece 122, and may be permanently or impermanently secured thereto. For example, in certain embodiments, the cutting tool assembly 130 is removable from the handpiece 122 and interchangeable with other surgical tools. In such embodiments, the cutting tool assembly 130 may include one or more adapters disposed at a proximal end of the tubular body 132 for coupling the cutting tool assembly 130 with a handpiece, e.g., handpiece 122. FIG. 3 illustrates an example adapter 336 disposed at the proximal end of the tubular body 132.

The tubular body 132 of the cutting tool assembly 130 may be configured to be inserted into a cannula or surgical incision, e.g., during various posterior and anterior ophthalmic surgical procedures such as retinotomies and retinectomies, merely as examples. The pair of blades 134, which are at least partially received within the tubular body 132, extend from a distal end of the tubular body 132 along the longitudinal axis A. As described above, the blades 134 may be actuated by manipulation of the actuation mechanism 124 by the user. For example, depressing and/or releasing the actuation mechanism 124 relative to the handpiece 122 (represented by arrows in FIG. 2) may cause the blades 134 to perform a cutting motion.

Figure 4:
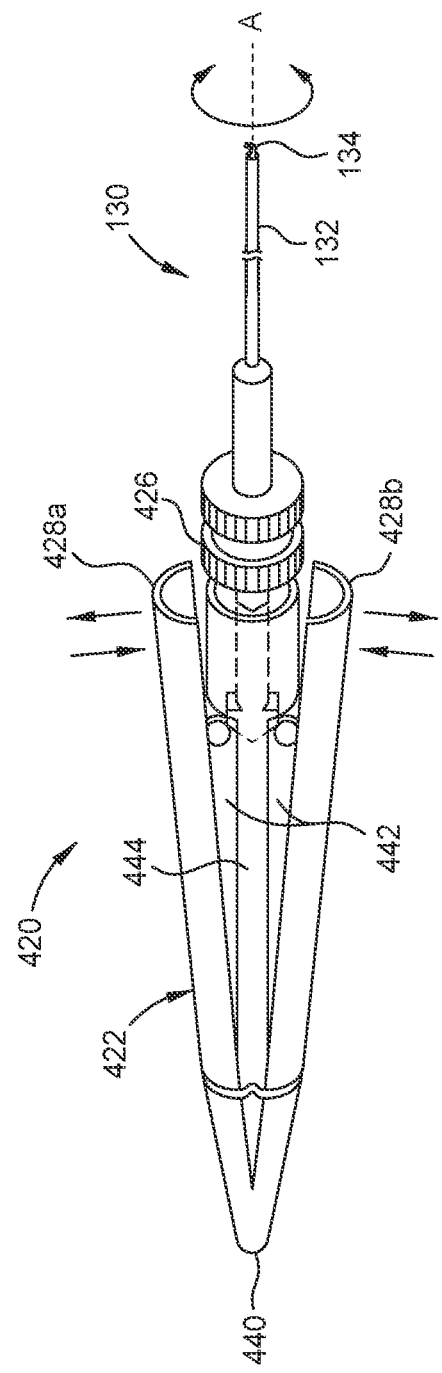
FIG. 4 illustrates a perspective view of another exemplary surgical device used in combination with the cutting tool assembly of FIGS. 1-3, in accordance with certain embodiments of the present disclosure.

Turning now to FIG. 4, another exemplary surgical device 420 is illustrated. Similar to the surgical device 220, the surgical device 420 is an exemplary embodiment of the surgical device 120 for use with the cutting tool assembly 130. Unlike the surgical device 220, however, the surgical device 420 includes a handpiece 422 which itself acts as an actuation component for the cutting tool assembly 130. As shown, the handpiece 422 is comprised of two housing components 428a and 428b, which may be semi-circular in shape. The housing components 428a, 428b are connected at distal ends thereof by a joint 440, and are further operatively engaged with a sliding member 442 disposed between the housing components 428a, 428b. The sliding member 442 is connected to an adapter arm 444, which is permanently or impermanently secured to the cutting tool assembly 130 and may include a rotatable component 426. Compression of the housing components 428a, 428b (represented by arrows in FIG. 4) activates the sliding member 442, which then actuates the blades 134 of the cutting tool assembly 130 to perform a cutting motion.

Figure 5A:
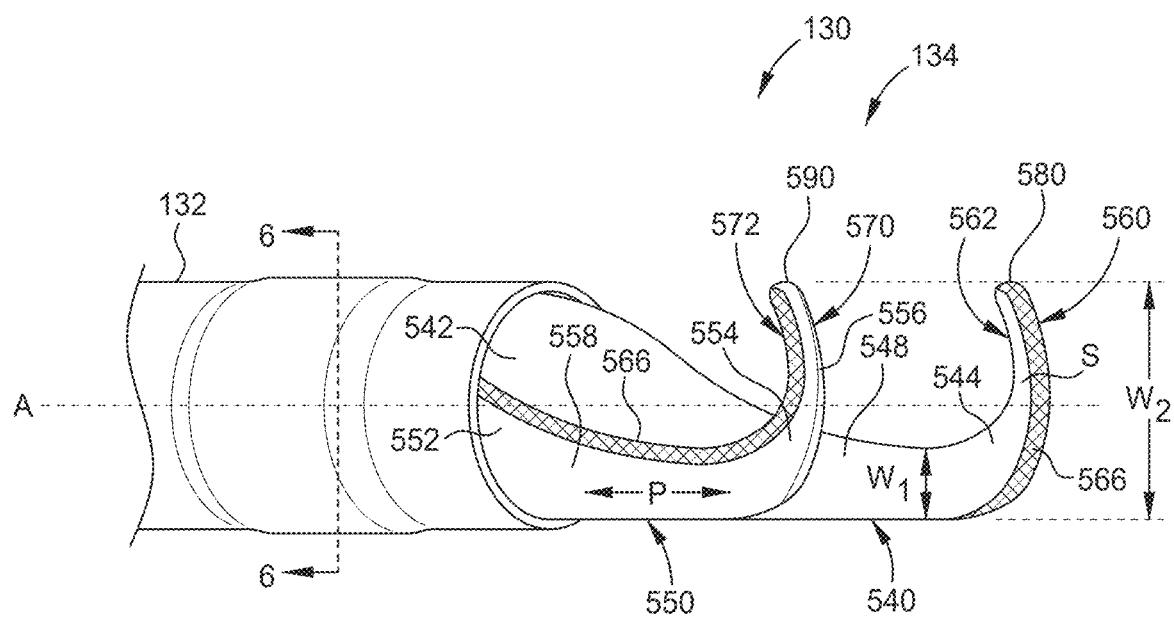
FIG. 5A illustrates an enlarged perspective view of the cutting tool assembly of FIGS. 1-4, in accordance with certain embodiments of the present disclosure.
Figure 5B:
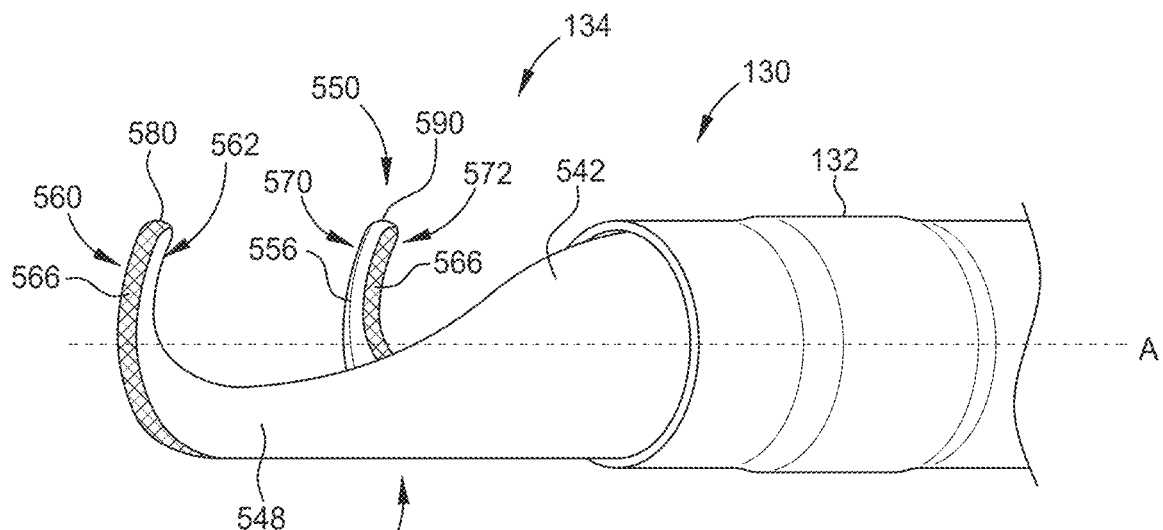
FIG. 5B illustrates an enlarged perspective view of the cutting tool assembly of FIG. 5A, taken from an opposite side of the tool compared with FIG. 5A, in accordance with certain embodiments of the present disclosure.

FIG. 5A-5B illustrate enlarged perspective views of the cutting tool assembly 130, and in particular, the blades 134, from opposite sides of the cutting tool assembly 130, in accordance with certain embodiments of the present disclosure. Accordingly, FIGS. 5A-5B are herein described together for clarity.

As shown, the blades 134 include a first blade 540 and a second blade 550 that are each at least partially received in the tubular body 132 and extend along the longitudinal axis A. The first blade 540 may be fixed relative to the tubular body 132, e.g., by welding or similar techniques. The first blade 540 includes a body portion 542 disposed along the longitudinal axis A and an end portion 544 laterally extending from the body portion 542. The second blade 550 may be configured to move longitudinally within the tubular body 132 relative to the first blade 540 along a cutting path P. Similar to the first blade 540, the second blade 550 includes a body portion 552 disposed along the longitudinal axis A and an end portion 554 laterally extending from the body portion 552. The end portion 554 includes a cutting edge 556 on a distal surface 570 thereof. The cutting edge 556 may be configured to cut material, e.g., ocular tissue, disposed adjacent or against the end portion 544 of the first blade 540. More specifically, the cutting edge 556 may cut material in a scissor-like cutting motion, in cooperation with the end portion 544 of the first blade 540. In certain examples, the end portion 544 is pressed against an ocular tissue, e.g., a retinal layer, while the cutting edge 556 cuts a membrane or layer disposed between the cutting edge 556 and the end portion 544.

The first blade 540 and the second blade 550 may include relatively thin neck portions 548, 558, respectively, disposed between the end portions 544, 554, and the body portions 542, 552. The utilization of at least the thin neck portion 548 may facilitate movement of the second blade 550 relative to the first blade 540 while also allowing a cutting surface S that can fully engage with the cutting edge 556. In other terms, the neck portion 548 defines a lateral width $W_1$ that is smaller than a lateral width $W_2$ of the cutting edge 556. Any wear, e.g., as caused by friction between the cutting edge 556 and the first blade 540, may also be reduced while allowing a relatively larger width of the cutting edge 556 to be applied to a material, e.g., tissue, for cutting.

As shown in FIGS. 5A-5B, one or both end portions 544, 554 of the blades 540, 550 may include rounded, curved, or bowed surfaces to reduce the risk of undesired damage to intraocular tissues during ophthalmic surgical procedures. For example, the end portion 544 may include a bowed distal surface 560 and/or a bowed proximal surface 562. In certain embodiments, the bowed distal surface 560 is shaped to correspond with a radial curvature of, e.g., the retina and/or RPE, thus enabling the first blade 540 to be pressed upon a retinal layer during a surgical procedure with reduced risk of damaging any overlying or underlying membranes or layers, e.g., the photoreceptor layer and RPE. In certain embodiments, the end portion 554 of the second blade 550 has a corresponding morphology to the end portion 540, and includes a bowed distal surface 570 and/or a bowed proximal surface 572 as well. In embodiments where both proximal and distal surfaces of each end portion 544, 554 are bowed, as shown in FIGS. 5A-5B, the end portions 544, 554 define a generally "hook" shape extending laterally, e.g., relative to the longitudinal axis A. In further embodiments, the end portions 544, 554 include rounded tips 580, 590, respectively, between proximal and distal surfaces thereof.

To further reduce the risk of damage to ocular tissues when using the cutting tool assembly 130, one or more surfaces of the end portions 544, 554 may also be coated with a coating 566, which provides a softer surface for contacting against ocular tissues. For example, in certain embodiments, at least the distal surface 560 of the end portion 544, which may be pressed against an ocular structure (e.g., the retina) during an ophthalmic surgical procedure, is coated with the coating 566. In further embodiments, the proximal surface 562 of the end portion 544, and/or the proximal surface 572 of the end portion 554, are coated with the coating 566. Exemplary materials for the coating 566 generally include materials that are neither lipophilic nor hydrophilic, thus having a low surface activity and reducing the likelihood of ocular tissue cells (e.g., retinal cells such as RPE cells, rods, and cones) adhering to the cutting tool assembly 130. For example, the coating 566 may comprise or be formed of polymeric materials such as polytetrafluoroethylene (PTFE), fluorinated ethylene propylene (FEP), polyvinylidene fluoride (PVDF), rerfluoroalkoxy (PFA), ethylene tetrafluoroethylene (ETFE), ethylene chlorotrifluoroethylene (ECTFE), tetrafluoroethylene perfluoromethylvinylether (MFA), polychlorotrifluoroethylene (PCTFE), polytetrafluoroethylene (PEEK), terpolymer of tetrafluoroethylene (THV), and the like. In embodiments where multiple surfaces of the end portions 544, 554 are coated with the coating 566, one or more of the coated surfaces may have coatings comprising or formed of the same or different materials, e.g., polymers.

Figure 6:
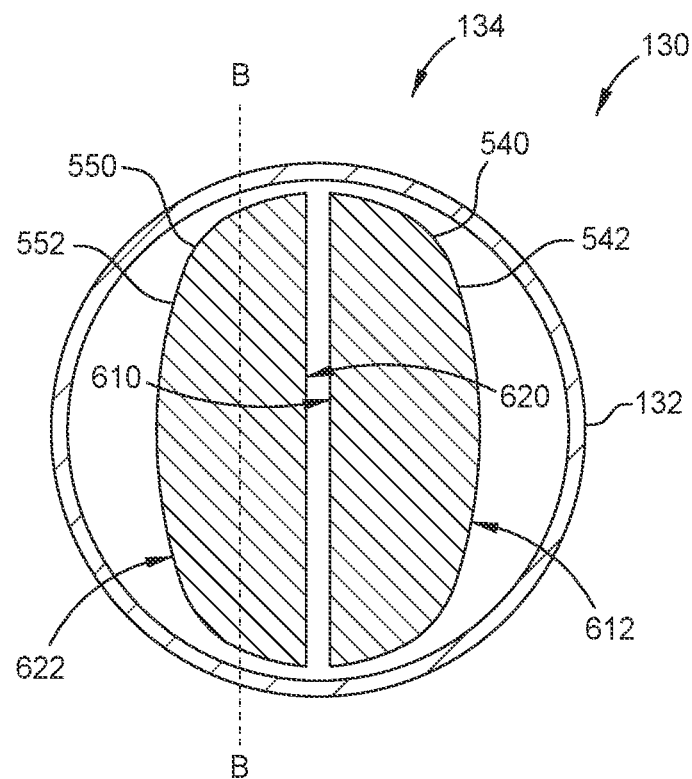
FIG. 6 illustrates a front cross-sectional view of the cutting tool assembly of FIGS. 5A and 5B at a point along a longitudinal axis thereof, in accordance with certain embodiments of the present disclosure.

FIG. 6 illustrates a cross-sectional view of the tubular body 132 and blades 134, in accordance with certain embodiments of the present disclosure. More specifically, FIG. 6 illustrates a cross-sectional view of the body portions 542, 552 of the first blade 540 and second blade 550, respectively. As shown, the cross-sections of the body portions 542, 552, as viewed normal to the longitudinal axis A of the tubular body 132, are each defined by inner (i.e., centrally disposed) edges 610 and 620, as well as outer (i.e., lateral) edges 612 and 622 extending between opposing sides of the inner edges. Further, though the cross sections of body portions 542, 552 in FIG. 6 are symmetrical with respect to each other, each of the cross sections is generally asymmetrical with respect to a line B that is substantially parallel to the inner edges 610, 620. The asymmetrical cross-sections of each body portion 542, 552 may facilitate an enlarged section modulus and thus, improved strength, as compared to blades having a quadrangular-shaped cross-section.

The inner edges 610, 620 of the body portions 542, 552 are generally adjacent to one another and extend across substantially the entire inner diameter of the tubular member 132. In certain embodiments, the inner edges 610, 620 have similar lengths and cross-sectional shapes. Alternatively, the inner edges 610, 620, and/or the blades 550, 560 in general, may be different sizes, e.g., where one of the blades is enlarged for more secure positioning within the tubular body 132. The outer edges 612, 620 of each body portion 542, 552 are generally curved or rounded in shaped, similar to the surfaces of the end portions 544, 554, to reduce the risk of damage when using the cutting tool assembly 130 during an ophthalmic surgical procedure. However, in certain embodiments, the outer edges 612, 620 may include one or more linear surfaces. Note that the cross-sections of the body portions 542, 552 depicted in FIG. 6 are but one embodiment thereof, and that other geometries are also contemplated. For example, in certain embodiments, the cross-sections of body portions 542, 552 may be asymmetrical with respect to each other, and/or the body portions 542, 552 may be substantially quadrangular.

Figure 7:
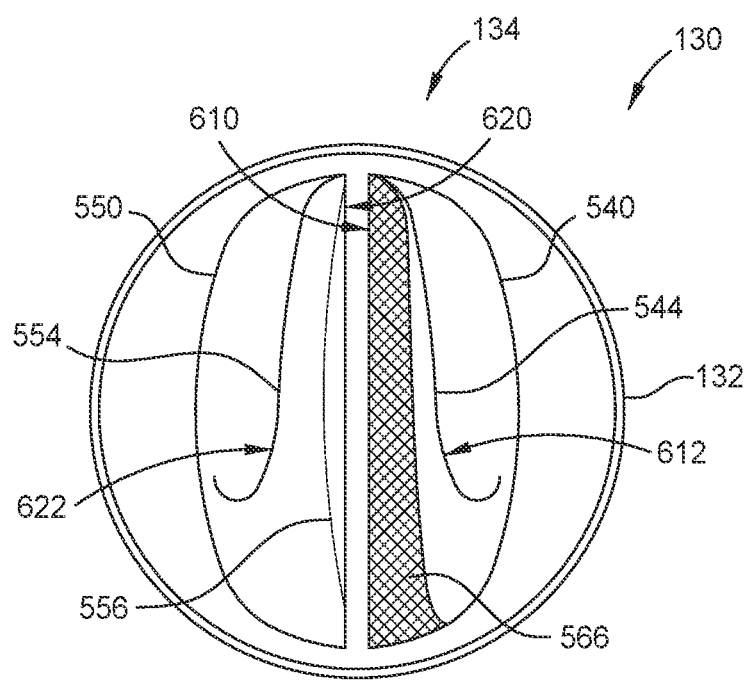
FIG. 7 illustrates a front orthogonal view of the cutting tool assembly of FIGS. 5A and 5B, in accordance with certain embodiments of the present disclosure.

FIG. 7 illustrates an orthogonal front view of the tubular body 132 and blades 134, in accordance with certain embodiments of the present disclosure. More specifically, FIG. 7 illustrates an orthogonal front view of the end portions 544, 554 of the first blade 540 and second blade 550, respectively. Accordingly, the distal surface 560 of the blade 540, shown with coating 566, and the distal surface 570 of the blade 550, shown with cutting edge 556, are illustrated. Similar to the body portions 542, 552, the end portions 544, 554, as viewed normal to the longitudinal axis A of the tubular body 132, are each laterally defined by the inner edges 610 and 620, as well as the outer edges 612 and 620. However, in certain embodiments, along the end portions 544, 554, the inner edges 610, 620 and/or outer edges 612, 620 may have different lateral dimensions (e.g., lengths or widths) as compared to the same along different portions of the body portions 542, 552. In such embodiments, the diminished lateral dimensions of the end portions 544, 554 relative to the body portions 542, 552 may reduce the risk of damage to ocular tissues when using the cutting tool assembly 130, thus providing improved safety therewith as compared to other cutting tools.

In summary, embodiments of the present disclosure generally relate to microsurgical cutting devices for ophthalmic procedures. In particular, the embodiments herein provide an improved cutting tool design with one or more cutting blades having a curved outer based on a curvature of a target tissue, e.g., the retina and/or RPE. Even further, the curved surfaces of the one or more cutting blades may be coated with a polymer coating, thus providing a softer surface for contacting against ocular tissues. Accordingly, the described embodiments enable safer performance of ophthalmic surgical procedures, such as retinotomies and retinectomies, with reduced risk of unwanted damage to periphery tissues, as compared to conventional tools and devices.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The foregoing description is provided to enable any person skilled in the art to practice the various embodiments described herein. Various modifications to these embodiments will be readily apparent to those skilled in the art, and the generic principles defined herein may be applied to other embodiments. Thus, the claims are not intended to be limited to the embodiments shown herein, but are to be accorded the full scope consistent with the language of the claims.

Within a claim, reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for." The word "exemplary" is used herein to mean "serving as an example, instance, or illustration." Any aspect described herein as "exemplary" is not necessarily to be construed as preferred or advantageous over other aspects.

EXAMPLE EMBODIMENTS

Embodiment 1

A cutting tool assembly, comprising: a first blade in a fixed position, the first blade comprising: a first longitudinal body portion; and a first end portion extending laterally from a distal end of the first longitudinal body portion, the first end portion comprising a distal surface coated with a first polymer coating; and a second blade configured to move relative to the first blade, the second blade comprising: a second longitudinal body portion; and a second end portion extending laterally from a distal end of the second longitudinal body portion, the second end portion comprising a distal surface having a cutting edge and a proximal surface coated with a second polymer coating, wherein longitudinal movement of the second blade facilitates cutting of a tissue by the cutting edge.

Embodiment 2

The cutting tool assembly of Embodiment 1 described above, wherein the second polymer coating comprises polytetrafluoroethylene (PTFE) or fluorinated ethylene propylene (FEP).

Embodiment 3

The cutting tool assembly of Embodiment 1 described above, wherein a proximal surface of the first end portion is coated with a third polymer coating.

Embodiment 4

The cutting tool assembly of Embodiment 3 described above, wherein the third polymer coating comprises polytetrafluoroethylene (PTFE) or fluorinated ethylene propylene (FEP).

Embodiment 5

The cutting tool assembly of Embodiment 1 described above, wherein the first polymer coating and the second polymer coating comprise the same polymer.

Embodiment 6

A surgical tool, comprising: a tubular shaft defining a longitudinal axis, the tubular shaft further defining an aperture at a first end of the tubular shaft; and a pair of blades received at least partially within the tubular shaft through the aperture and extending along the longitudinal axis, the pair of blades comprising: a first blade in a fixed position relative to the tubular shaft, the first blade comprising: a first body portion; and a first end portion extending laterally from a distal end of the first body portion, the first end portion comprising a distal surface coated with a first polymer coating; and a second blade configured to move relative to the first blade and the tubular shaft along the longitudinal axis, the second blade comprising: a second body portion; and a second end portion extending laterally from a distal end of the second body portion, the second end portion comprising a distal surface having a cutting edge and a proximal surface coated with a second polymer coating.

Embodiment 7

The surgical tool of Embodiment 6 described above, wherein the first polymer coating and the second polymer coating comprise the same polymer.

Embodiment 8

The surgical tool of Embodiment 7 described above, the first polymer coating and the second polymer coating comprise polytetrafluoroethylene (PTFE) or fluorinated ethylene propylene (FEP).

Embodiment 9

The surgical tool of Embodiment 6 described above, wherein the first end portion further comprises a proximal surface coated with a third polymer coating.

Embodiment 10

The surgical tool of Embodiment 9 described above, wherein the third polymer coating comprises polytetrafluoroethylene (PTFE) or fluorinated ethylene propylene (FEP).

Embodiment 11

The surgical tool of Embodiment 6 described above, wherein the surgical tool is configured to fit through a 23-gauge cannula.

Embodiment 12

The surgical tool of Embodiment 6 described above, wherein the surgical tool is configured to fit through a 25-gauge cannula.

Embodiment 13

The surgical tool of Embodiment 6 described above, further comprising: a handle connected to the tubular shaft, the handle comprising a lever configured to move the second blade along the longitudinal axis upon manipulation of the lever while the first blade remains stationary.

Embodiment 14

The surgical tool of Embodiment 6 described above, further comprising: a handle connected to the tubular shaft, the handle comprising: a housing having two elongated semi-circular members coupled at a joint, wherein manipulation of the semi-circular members moves the second blade along the longitudinal axis upon manipulation of the lever while the first blade remains stationary.

What is claimed is:

1. A cutting tool assembly, comprising:
a first blade in a fixed position, the first blade comprising:
a first longitudinal body portion; and
a first end portion extending laterally from a distal end of the first longitudinal body portion, the first end portion comprising a distal surface coated with a first polymer coating; and
a second blade configured to move relative to the first blade, the second blade comprising:
a second longitudinal body portion;
a second end portion extending laterally from a distal end of the second longitudinal body portion, the second end portion comprising a distal surface having a cutting edge and a proximal surface coated with a second polymer coating, wherein longitudinal movement of the second blade facilitates cutting of a membrane by the cutting edge;
wherein the distal surface of the first end portion has a bowed morphology having a radius of curvature that is based on a radius of curvature of retinal pigment epithelium (RPE);
wherein the distal surface of the second end portion has a bowed morphology;
wherein the first end portion further comprises a rounded tip between the distal surface and a proximal surface of the first end portion;
wherein the second end portion further comprises a rounded tip between the distal surface and the proximal surface; and
wherein the first blade comprises a neck portion between the first longitudinal body portion and the first end portion and wherein the neck portion comprises a lateral width that is smaller than a lateral width of the cutting edge;
wherein the distal surface of the first end portion that has the bowed morphology with the radius of curvature that is based on the radius of curvature of the retinal pigment epithelium (RPE), the rounded tip on the first end portion, and the distal surface coated with the first polymer coating are configured to allow the distal surface of the first end portion to be pressed against a retinal layer during the cutting of the membrane; and
wherein the second blade cuts the membrane in a scissor-like motion relative to the first blade.

2. The cutting tool assembly of claim 1, wherein the first polymer coating comprises polytetrafluoroethylene (PTFE) or fluorinated ethylene propylene (FEP).

3. The cutting tool assembly of claim 1, wherein the second polymer coating comprises polytetrafluoroethylene (PTFE) or fluorinated ethylene propylene (FEP).

4. The cutting tool assembly of claim 1, wherein the cutting tool assembly is configured to fit through a 23-gauge cannula.

5. The cutting tool assembly of claim 1, wherein the cutting tool assembly is configured to fit through a 25-gauge or 27-gauge cannula.

6. The cutting tool assembly of claim 1, wherein the distal surface of the second end portion has a radius of curvature that is based on the radius of curvature of the retinal pigment epithelium (RPE).

7. The cutting tool assembly of claim 1, further comprising a rotatable component operable to adjust a rotational orientation of the cutting tool assembly.

8. A surgical tool, comprising:
a tubular shaft defining a longitudinal axis, the tubular shaft further defining an aperture at a first end of the tubular shaft; and
a pair of blades received at least partially within the tubular shaft through the aperture and extending along the longitudinal axis, the pair of blades comprising:
a first blade in a fixed position relative to the tubular shaft, the first blade comprising:
a first body portion; and
a first end portion extending laterally from a distal end of the first body portion, the first end portion comprising a distal surface coated with a first polymer coating; and
a second blade configured to move relative to the first blade and the tubular shaft along the longitudinal axis, the second blade comprising:
a second body portion; and
a second end portion extending laterally from a distal end of the second body portion, the second end portion comprising a distal surface having a cutting edge and a proximal surface coated with a second polymer coating, wherein longitudinal movement of the second blade facilitates cutting of a tissue by the cutting edge;
wherein the distal surface of the first end portion has a bowed morphology having a radius of curvature that is based on a radius of curvature of retinal pigment epithelium (RPE);
wherein the distal surface of the second end portion has a bowed morphology;
wherein the first end portion further comprises a rounded tip between the distal surface and a proximal surface of the first end portion;
wherein the second end portion further comprises a rounded tip between the distal surface and the proximal surface; and
wherein the first blade comprises a neck portion between the first body portion and the first end portion and wherein the neck portion comprises a lateral width that is smaller than a lateral width of the cutting edge;
wherein the distal surface of the first end portion that has the bowed morphology with the radius of curvature that is based on the radius of curvature of the retinal pigment epithelium (RPE), the rounded tip on the first end portion, and the distal surface coated with the first polymer coating are configured to allow the distal surface of the first end portion to be pressed against a retinal layer during the cutting of the tissue; and
wherein the second blade cuts the tissue in a scissor-like motion relative to the first blade.

9. The surgical tool of claim 8, wherein the first polymer coating or the second polymer coating comprises polytetrafluoroethylene (PTFE) or fluorinated ethylene propylene (FEP).

10. The surgical tool claim 8, wherein the distal surface of the second end portion has a radius of curvature that is based on the radius of curvature of the retinal pigment epithelium (RPE).

11. The surgical tool of claim 8, further comprising a rotatable component operable to adjust a rotational orientation of the surgical tool.

\* \* \* \* \*